Patented Jan. 9, 1951

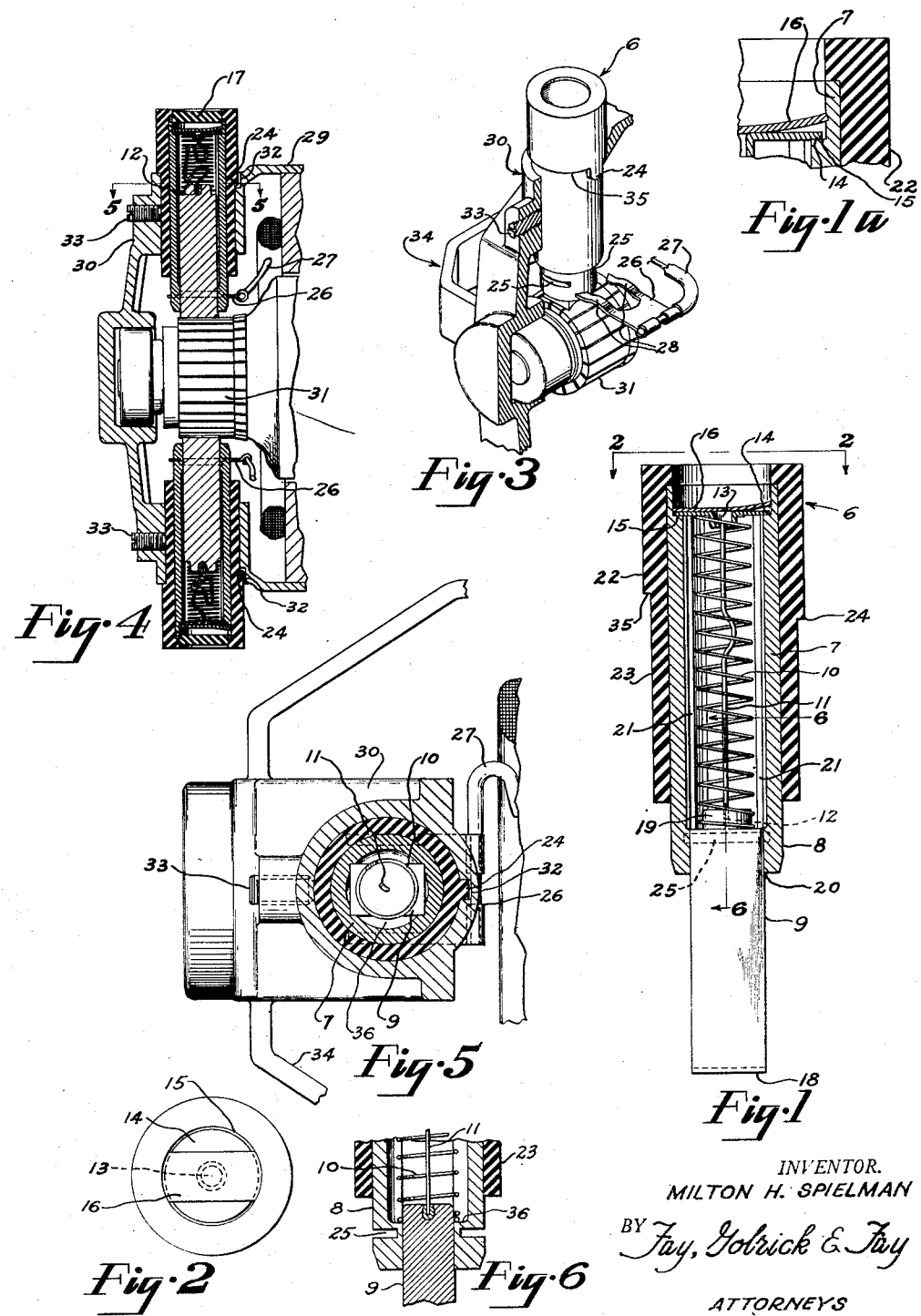

2,537,714

UNITED STATES PATENT OFFICE 2,537,714

BRUSH HOLDER AND METHOD OF ASSEMBLING SAME INTO ELECTRIC MOTORS

Milton H. Spielman, Cuyahoga Falls, Ohio, assignor to The Lamb Electric Company, Kent, Ohio, a corporation of Ohio Application March 10, 1950, Serial No. 148,969

12 Claims. (Cl. 171—323)

The present invention relates to improvements in brush holders for small, commutator type electric motors, and is particularly directed to the production of smaller types of motors such as those used in vacuum sweepers, ventilator fans and the like.

An object of this invention is the provision of a brush-holder arrangement which is simple, durable and cheaply produced.

Another object of this invention is the provision of a brush holder which can be pre-assembled to form a sub-assembly comprising the brush, compression spring, insulation, brush tube and brush tube closure which, as a unit, is readily and quickly incorporated into the motor in the final assembling thereof.

Another object of this invention is the provision of a brush holder which is readily conductively connected to the line or stator leads.

Another object of this invention is the provision of an improved method of assembling brushes and parts auxiliary thereto into electric motors.

Another object of this invention is the provision of a method of pre-assembling the brush holder, of assembling it into the motor, and connecting it to the brush leads in such manner as to eliminate awkward and time consuming assembling operations heretofore necessary in the assembly of small motors, and which, in consequence, leads to appreciable savings in assembly costs.

Further objects and advantages of this invention will appear in the following specification and drawings.

In the drawings, showing the preferred form of this invention—

Fig. 1 shows a longitudinal section of the pre-assembled brush holder taken substantially through the axis thereof;

Fig. 1a is a detail view of the portion of Fig. 1 showing the position of the spring metal retaining piece and adjacent parts;

Fig. 2 is a top view of the pre-assembled brush holder of Fig. 1;

Fig. 3 shows the pre-assembled brush holder in perspective in the position it has in the motor just before the brush-lead clip is attached, with only the related parts of the motor and casing being shown in an axial section;

Fig. 4 is a sectional view of the commutator end portion of the completely assembled motor, the section being taken through the axes of the brush holders; and Fig. 5 is a sectional view of the final motor assembly taken at 5—5 on Fig. 4.

Fig. 6 is a partial sectional view taken along 6—6 of Fig. 1.

In modern small electric motors of the commutator type the brush is usually square or rectangular in cross section, and has the commutator end pre-formed before assembly to conform to the cylindrical surface of the commutator with which it will come in contact. This pre-forming of the brush end obviates the necessity of a long "bench-run" or breaking-in period during which the flat end of a brush would be worn to a shape conforming to the commutator, before the motor is put in service.

To obtain the full advantage of the pre-shaping of the brush end, the brush holding tube is made with a brush hole closely conformed to the cross-sectional shape of the brush so that the brush will not rotate in the tube, and then during assembly the brush tube is carefully aligned in the frame so that the brush end will fit the commutator surface closely.

Heretofore in the assembling of these motors, the practice has been to insert the brush-holder in the apertures provided in the motor frame; then to insert a square or rectangular tool through the length of the two brush-holders, whereby the brush holes of the brush holders were aligned with each other with respect to their cross-sections; and finally the tool was rotated to turn the two holders so that the rectangular brush holes thereof would be properly orientated with respect to the commutator in the assembled motor. Next the field or stator coils, armature or rotor, and frame pieces were assembled. The leads to the brush holders from the power line or from the stator coils were next attached, and the brushes, brush springs and brush tube closures were put in place.

The electrical leads to the brush tubes are attached after the brush tubes, armature, field or stator coils and frame have been assembled. These leads from the stator coils and the power line are often provided with U-clips or a "garter" type closed metal helix which grasps an exposed portion of the metallic conducting tube of the brush holder. This exposed portion of the brush tube is provided with transverse slots for the reception of the U-clip, or with a circumferential groove to retain the circular "garter" which is slipped over the inner end of the tube. With either type of lead, the attachment is made by manipulating the clip or "garter" into the slots or over the tube end by means of tools inserted from the side through the conventional openings in the frame at the commutator end of the motor. Further, the closure for the outer end of the brush tube, which retains the compression spring, holding the brush against the commutator, has been a threaded cap or plug.

Several disadvantages attend the use of brush holders and the method of motor assembly of the prior art. Firstly, the old mode of orientation of the brush tubes with the frame, which ultimately controls the orientation of the preformed brush tip with respect to the commutator, requires the fixing of the brush tube in the frame before the armature and stator coils are put in place, and before the leads are attached to the brush tubes. Hence the holders cannot be moved to facilitate the connection of the U-clips or other means of attachment to the brush-tubes. Thus the brush-lead clips or connectors had to be manipulated by means of tools in the constricted space between the brush-holder, the stator coils, and the commutator and rotor in order to attach them to the brush holder. This was necessitated by the fact that the portion of the connector which was joined to the lead wire was to be placed between the brush tube and the rotor, so that the path of insertion had to be parallel to the rotor shaft.

Secondly, the aligning operation itself requires labor and time that contribute to assembly costs. Thirdly, since the brush, brush-spring and brush-tube closure are put into place after the armature has been put in place and the frame parts have been assembled, it is impossible to inspect the brush assembly for free unhindered movement of the brush in its entire travel in the brush tube.

Fourthly, the manufacture of the threaded portions of the brush-holder and its closure constitute cost items. Fifthly, the use of a screwed-on closure often results in a twisting of the spring, which, being communicated to the brush, is sufficient to cause the brush to bind in the brush hole, so as to hinder the free advance of the brush toward the commutator as the brush wears in service. The consequence of this is simple failure in motor operation, due to lack of brush contact or worse, arcing and severe burning of the commutator before positive motor failure. When the brush is provided with a "pig-tail" or shunt, this tendency toward binding is aggravated. In such a case, there is a flexible conductor fixed in the end of the brush away from the commutator. One end of the brush-spring is fitted over a neck on the end of the brush with the pig-tail threaded through the spring to the center of a metal disk or plate to which it is soldered, the free spring being of a greater length than the conductor. When such an assembly is twisted by the procedure of screwing on the brush tube closure, a part of the limp pig-tail is often caught between turns of the spring. Hence, in addition to the binding of the brush by turning against the brush tube walls, the brush may be held back by the pig-tail which is caught in some part of the spring.

The present invention overcomes these several disadvantages and difficulties of the old practice. Now it is possible to assemble the stator coils, rotor and the frame entirely before the brush holders are put in place. The brush-holder, brush, brush-spring and tube-closure are pre-assembled and put into the frame as a unit which is self-aligning due to the provision of a suitably placed key-like projection on the holder and keyway on the frame. When the holder is rotated in the frame the key finds the key-way and drops in to give the required orientation. Hence, it is possible to move the holder in the frame, as hereinafter described, to facilitate attaching the lead connecting devices to the brush-tubes, thereby obviating the first named disadvantage.

The second disadvantage of a separate aligning operation joined with the need of a special tool is done away with. The third untoward feature of the old practice—the impossibility of inspecting the freedom of the entire brush movement—is obviated, since the brush holder unit, with closure, brush and spring pre-assembled, can be inspected before the unit is placed in the frame. By the provision of a new type of tube closure, a non-threaded device hereinafter described, the fourth and fifth difficulties are met, for the costs of cutting threads and of screwing threaded structures together are saved; while at the same time there is no possibility of twisting spring and brush, so that brush binding or hold back cannot occur. A further advantage arises from the fact that the several small parts associated with the brush are pre-assembled, and put into the frame as one unit, rather than being placed in the frame one by one as single small pieces.

Further, since the brush spring is now inserted in the holder while it is outside of the frame, the insertion is easier than in the old practice, for the brush, not being blocked by the commutator, is as far down in the brush tube as possible, with the result that the spring need not be compressed to such a great extent.

When these features of this invention are viewed in the light of modern assembly line production, the substantial saving in labor and manufacturing costs is clear and the great utility of the invention is obvious.

The brush holder, shown sub-assembled in Figs. 1 and 2, has an outer tube of an insulating material, generally indicated 6, surrounding and gripping a metallic brush tube 7, which has the portion 8 exposed; a brush 9 which is urged outwardly by the compression spring 10; a flexible conductor or "pig-tail" 11 fixed in the cavity 12 of the inner end of the brush and to the perforated depressed portion 13 of the metallic restraining disk 14, which rests on the inner shoulder 15 of the brush tube 7; a retaining piece 16 of spring metal; and an insulating end disk 17 (shown in Fig. 4 but not in Figs. 1 and 2) which closes the end of the insulating tube 6. For low current brushes, the flexible conductor 11 may be dispensed with.

The retaining piece 16, slightly longer than the diameter of tube 7 above shoulder 12, is formed preferably from spring metal, with arcuate ends comfortable in shape to the inner wall of the tube 7. After the piece 16 is forced into the end of holder, one end abuts against the tube wall, while the other end curves upward to bite into the wall of tube 7. As shown in the Figs. 1 and 1a, this results in a substantial portion of piece 16 bearing flat on disk 14. The width of the piece 16 is smaller than the diameter of the tube 7 above the shoulder 15, so that there are spaces between the edges of the piece 16 and the inside of the tube 7, thus allowing for the insertion of a tool for extracting the piece 16 when desired. The insulating end disk 17 may be formed from a suitable insulating material, preferably one that is flexible though tough, so that it can be dug or pulled out of the holder without appreciable damage. This new means of retaining spring and brush in the holder, which eliminates the formation and assembly of threaded caps, is shown in detail in Fig. 1a in partial section.

The brush 9 in this instance is rectangular in cross-section and has its outer end preshaped at 18 to conform to the commutator surface, while the inner end has a reduced portion 19, over which the end of the compression spring 10 is fitted. As is clearly shown in Fig. 6, the diameter of the spring 10 is sufficiently greater than the narrower dimension of the brush cross-section so that the end of the spring, which is fitted over reduced portion 19 of the brush, is caught by the shoulder 36, which lies between the rectangular brush hole 20 and the main bore of the brush tube 7. Thus the spring is retained within the brush tube, even when the entire subassembly of brush and associated parts is not in the motor frame. Since the end of spring 10 is fitted over reduced portion 19 of the brush, the brush is also retained partly in the holder. The end of the tube 7 is provided with the rectangular opening 20 to restrain the brush from rotating in the tube, and preferably longitudinal grooves 21 are formed in the inner wall of tube 7 to receive the corners of the rectangular brush and guide it into the rectangular opening.

The cylindrical insulating tube is provided with an upper portion 22 of a larger diameter than the lower portion 23. A key-like projection 24, best seen in Fig. 3, is also provided thereon, which has a definite relation to the position of the rectangular brush-hole, and thus to the brush itself.

Slots 25 are formed in the exposed portion 8 of the brush tube for receiving the brush-lead connecting clips 26, as shown in Figs. 3-5. These slots are best formed as a pair diametrically disposed on opposite sides of the tubes, and they have a definite position relative to the position of the brush in the holder. As here shown, the slots 25 are cut with the bottoms substantially parallel to each other and to the cylindrical concave preformed surface 18 on the end of the brush. The brush-lead clips 26, to which the leads 27 are attached by soldering, crimping or other suitable means, may be stamped out of sheet metal in dimensions adapted to the size of the slots and the free space available inside the motor, and are formed with crimped or curved prongs 28 adapted to snap into the slots and be held there firmly.

On the motor frame, generally indicated 29, there are brush-holder posts or mountings 30, which have cylindrical openings adapted to receive the lower portion 21 of the brush holders and to hold them in proper relation to the commutator 31. A keyway 32, shown in Figs. 4 and 5, is formed in the inner side of each post to receive the projection 24 and so definitely to determine the position of the brush holder, and hence determine the final alignment of the preformed brush end 18 with respect to the commutator 31. Set screws 33 in the post, which bear on the insulating tube 6, hold the brush holder in final position.

In practice, the insulating tube 6 may be formed directly on the metal brush tube 7 by molding a suitable plastic material about the tube 7 in a die so shaped as to give an exterior shape, including the key-like projection 24, of the desired dimensions. If the rectangular opening 20 or grooves 21 were formed before this molding operation, the metal piece would have to be placed in the molding die in fixed and definite position so that the key projection 24 would have the required position relative to the brush in the assembled brush holder. Alternatively, the insulating material may be molded about a metal blank for the tube 7, and then the slots 25, rectangular opening 20, grooves 21, and shoulder 15 formed thereafter in the proper relation to each other and the key 24.

In pre-assembling the brush holder, one end of the flexible conductor 11 is affixed to the brush by means known to the art; the spring 10 is slipped thereover and fitted over the brush end 19; with the requisite compression of the spring 10, the other end of the conductor 11 is attached at the center depression 13 of the disk 14 by soldering or other suitable means; the brush and attached parts are then inserted in the tube 7, and the retaining piece 16 is inserted to hold the disk 14 in place against the shoulder 15; finally, the insulating disk 17 is inserted in the end of the brush holder to complete the pre-assembling operations. The pre-assembled unit is then tested to make sure that the brush moves freely in the holder for its full length of travel without binding.

In the final assembling of the motor, the preassembled brush holder is inserted in the brushholder post, as shown in Fig. 3, with the slots 21 turned so the clip 25 can be inserted therein from one side by manipulation through the conventional open spaces of the frame between the brush-holder mountings and the strut 34. The brush holder is then turned 90° to its final position, established by the key 24 coinciding with and dropping into the keyway 32 in the frame, and the set screw 33 is tightened to complete the operation. Figs. 4 and 5 show this final position of the brush-lead clips and brush holder with its constituent parts in the assembled motor. The rotational position of the holder, and hence of the brush, is determined by the key 24 and keyway 32. With proper dimensions in the holder, the shoulder 35 of the insulating tube will rest on the frame when the holder is in final position, thus determining the clearance of the commutator and the end of tube 7.

This rotational procedure in connecting the leads to the brush holders can be used, of course, where other than clip and slot connections are used. Thus the holder may be rotated to position a transverse or oblique slot, hole or other recess formed in or on the brush tube wall so that the end of a lead wire may be readily inserted in the recess. The wall of the tube may thereafter be crimped, deformed or caused in some other fashion to grip the lead wire tip in the recess.

Where a garter or elastic ring type of connector is used, this brush holder still has great utility. In such a case the method of assembling the pre-assembled holder comprises placing the holder in the holder post, as shown in Fig. 3; slipping the elastic connector ring over the inner end of the brush tube until it slips into the annular groove provided thereon for its reception, the holder being displaced axially with respect to the brush holder post, as needed for ready manipulation; and lastly turning the holder to its final position determined by the key and key-way and tightening the set screw. The holder in this instance too is preferably rotated about 90° from final position for the placing of the connector, with the lead sidewise to the commutator, so that upon rotation to final position, the lead lies between the holder and stator coils,

I claim:

1. In the manufacture of commutator type fractional horsepower motors, the steps of connecting the stator winding and line leads to the conducting tubes of a brush holder assembly, consisting of forming a key on the insulation tube for the brush holder, forming a lead connector receiving recess near one end of the conducting tube for the brush holder, assembling the two said tubes with said recessed end extending past the end of the insulation tube, forming a key-way in the brush holder receiving opening of the motor frame, sliding the tube assembly partially into the said opening with the key of the insulation tube out of register with the key-way of the opening, attaching the lead in the said tube recess, turning the tube assembly to bring the insulation tube key in register with said key-way, completing the insertion of the tube assembly in the frame opening and securing the tube assembly in place.

2. In a method of assembling brush holders into an electric motor of the type wherein the connection of the stator and line leads to the brush holders is effected by means of a lead connector attached to a recess in the conducting tube of the brush holder, the recess being disposed inwardly of the inner end of the insulation tube of the brush holder, the steps of forming on the commutator end of the conducting tube a recess for the reception of the brush-lead connector; forming a key projection on the insulation tube of the brush holder in fixed definite position relative to the brush hole in said conducting tube; inserting the assembled holders in key-wayed openings provided in the motor frame with said key and keyway rotationally displaced enough from final position to allow easy manipulation through the conventional openings in the motor frame, while attaching the lead connector to the conducting tube recess; and rotating the electrically connected brush holder unit until said key projection drops into the keyway formed in the wall of said opening to thereby fix the final position of the brush holder unit; and securing the brush holder unit in said final position.

3. A method of assembling brushes into an electric motor of the type wherein the connection of the brush leads to the brush holder is effected by means of a brush-lead clip inserted in slots in the brush holder, the method including the steps of pre-assembling a brush holder unit comprised of a brush, a conducting brush tube provided near the commutator end with slots for the reception of brush-lead clips, an insulating tube on the conducting brush tube, a key-like projection on the insulating tube in fixed definite position relative to the brush hole in said brush tube, a closure for the end of the brush tube, and a spring interposed between said closure and said brush; inserting the pre-assembled unit in the mounting provided therefor on the motor frame in a position rotationally displaced enough from the final position to allow easy manipulation, through the conventional openings in the motor frame, of the lead clips to be inserted in the slots; inserting the brush-lead clip in the slots of the brush tube; rotating the brush-holder unit until said key projection drops into a key-way formed in the wall of said mounting, thereby determining the final position of the brush; and securing the brush-holder unit in said mounting.

4. A method of assembling brushes into an electric motor of the type wherein the connection of the brush leads to the brush holder is effected by means of a brush-lead clip inserted in slots in the brush holder, the method including the steps of pre-assembling a brush holder unit comprised of a brush, a brush tube provided near one end with slots for the reception of brush-lead clips, an insulating tube on the brush tube, a key-way projection on the insulating tube in fixed definite position relative to the brush hole in said brush holder, a closure for the end of the brush tube, and a spring interposed between said closure and said brush; inspecting the pre-assembled brush holder unit to insure free movement of the brush in the tube; inserting the pre-assembled unit in the mounting provided therefor on the motor frame in a position rotationally displaced enough from final position to allow easy manipulation, through the conventional openings in the motor frame, of the lead clips to be inserted in the slots; inserting the brush-lead clip in the slots of the brush tube; rotating the brush-holder unit until said key projection drops into a key-way formed in the wall of said mounting, thereby determining the final position of the brush; and securing the brush-holder unit in said mounting.

5. A brush holder sub-assembly for electric motors comprising a commutator brush; a metal conducting tube within which said brush is longitudinally movable, said tube having at that end remote from the commutator an enlargement of the internal bore and an internal circumferential shoulder; an insulating tube surrounding said metal tube; a metal disk placed upon said shoulder; a spring metal retaining piece wedged into said enlargement above the disk to hold the disk within said enlargement and against the shoulder; and a compression spring interposed between said disk and said brush.

6. A brush holder sub-assembly for electric motors comprising a commutator brush; a metal conducting tube within which said brush is longitudinally movable, said tube having at that end remote from the commutator an enlargement of the internal bore and an internal circumferential shoulder; an insulating tube surrounding said metal tube; a metal disk placed upon said shoulder; a spring metal retaining piece wedged into said enlargement above the disk to hold the disk within said enlargement and against the shoulder; and an insulating disk inserted in the insulating tube over said retaining piece.

7. A brush holder assembly for electric motors comprising a commutator brush; a metal conducting tube within which said brush is longitudinally movable, said tube having at that end remote from the commutator an enlargement of the internal bore and an internal circumferential shoulder; an insulating tube surrounding said metal tube; a metal disk placed upon said shoulder; a spring metal retaining piece wedged in said enlargement to hold the disk against the shoulder; said retaining piece having a length slightly greater than the internal diameter of the enlarged bore of the tube and having arcuate ends conformable to said enlarged bore; and a compression spring interposed between said disk and said brush.

8. A brush holder assembly for electric motors comprising a commutator brush; a metal conducting tube within which said brush is longitudinally movable, said tube having at that end remote from the commutator an enlargement of the internal bore and an internal circumferential shoulder; an insulating tube surrounding said metal tube; a metal disk placed upon said shoulder; a spring metal retaining piece wedged in said enlargement to hold the disk against the shoulder; said retaining piece having a length slightly greater than the internal diameter of the enlarged bore of the tube and having arcuate ends conformable to said enlarged bore; a compression spring interposed between said disk and said brush; and an insulating disk inserted in the insulating tube over said retaining piece.

9. For an electric motor having in the motor frame a key-wayed brush holder aperture, a brush holder sub-assembly comprising a commutator brush; a metal conductor tube for slideably mounting the brush against rotation; an insulator tube surrounding the brush tube with the commutator end of the metal tube extending beyond the end of the insulator tube, said commutator end of the metal tube having a conductor receiving recess formed therein; a compression spring in the brush tube, said spring having one end bearing on the brush; a closure for the metal and insulating tubes placed over the other end of the spring; and a key-like projection on the outer wall of said insulating tube, said projection having a definite position relative to the orientation of said brush for aligning the brush with respect to the motor commutator when the sub-assembly is inserted in the motor frame.

10. In an electric motor, a brush holder sub-assembly and means on the frame of the motor for mounting the brush holder assembly; said brush-holder assembly comprising a brush, a metal tube in which said brush is longitudinally movable, said tube having a brush channel shaped to prevent rotation of the brush in the tube and being provided near the commutator end thereof with a recess adapted to receive a brush-lead conductor tip therein, an insulating tube around said metal tube, said insulating tube being so disposed on the metal tube as to leave said recess exposed and accessible for the reception of a brush-lead conductor tip, a key-like projection on the outer wall of said insulating tube, said projection having a definite position relative to the brush channel in said metal tube, a closure for the end of said metal tube, a compression spring interposed between said brush and said closure; and said mounting means having cylindrical apertures disposed radially with respect to the commutator of the motor, said cylindrical apertures being adapted to receive the said brush-holder sub-assembly, and having a key-way to to receive said key-like projection thereby to determine the position of said brush with respect to the commutator of the motor.

11. In an electric motor, a brush-holder sub-assembly and means on the frame of the motor for mounting the brush-holder assembly; said brush-holder assembly comprising a brush, a metal tube within which said brush is longitudinally movable, said tube having a brush channel shaped to prevent rotation of the brush in the tube and said tube being provided near the commutator end thereof with a recess for the reception of a brush lead connector, and at the other end with an inner circumferential shoulder, the face of said shoulder being disposed toward said other end, an insulating tube around said metal tube, said insulating tube extending beyond the shouldered end of the metal tube and at the commutator end leaving the said recess exposed and accessible to brush-lead connectors, a key-like projection on the outer wall of said insulating tube, said projection having a definite position relative to the disposition of said brush, a metal disk on said shoulder, a spring metal retaining piece to hold said metal disk against said shoulder, a compression spring interposed between the metal disk and the brush; and said mounting means having cylindrical apertures disposed radially with respect to the commutator of the motor, said cylindrical apertures being adapted to receive the said brush holder sub-assembly and having a key-way to receive said key-like projection thereby to determine the position of said brush with respect to the commutator of the motor.

12. In an electric motor, a brush-holder sub-assembly and means on the frame of the motor for mounting the brush-holder assembly; said brush-holder assembly comprising a brush, a metal tube within which said brush is longitudinally movable, said tube having a brush channel shaped to prevent rotation of the brush in the tube and said tube being provided near the commutator end thereof with two external transverse recesses diametrically and oppositely disposed toward each other and at the other end with an inner circumferential shoulder, said recesses being adapted to receive a brush-lead clip, and said shoulder being disposed toward the said other end, an insulating tube around said metal tube, said insulating tube extending beyond the shouldered end of the metal tube and at the commutator end leaving said slots exposed and accessible to brush-lead clips, a key-like projection on the outer wall of said insulating tube, said projection having a definite position relative to the disposition of said brush, a metal disk on said shoulder, a spring metal retaining piece to hold said metal disk against said shoulder, a flexible conductor connecting said metal disk and the inner ends of said brush, a compression spring interposed between the metal disk and the brush; and said mounting means having cylindrical apertures disposed radially with respect to the commutator of the motor, said cylindrical apertures being adapted to receive the said brush-holder sub-assembly and having a key-way to receive said key-like projection thereby to determine the position of said brush with respect to the commutator of the motor.

MILTON H. SPIELMAN.

REFERENCES CITED

The following references are of record in the file of this patent:

UNITED STATES PATENTS

| Number | Name | Date |
|---|---|---|
| 481,701 | Lundell | Aug. 30, 1892 |
| 1,457,896 | Cook | June 5, 1923 |
| 1,761,066 | Bindschedler | June 3, 1930 |
| 1,933,628 | Kitto | Nov. 7, 1933 |
| 2,382,799 | Leach | Aug. 14, 1945 |
| 2,448,850 | Weber | Sept. 7, 1948 |

FOREIGN PATENTS

| Number | Country | Date |
|---|---|---|
| 5,672 | Great Britain | of 1915 |